United States Patent [19]
Hamlet

[11] 3,806,802
[45] Apr. 23, 1974

[54] AUTOMATIC QUADRATURE CONTROL AND MEASURING SYSTEM

[75] Inventor: John F. Hamlet, Huntsville, Ala.

[73] Assignee: The United States of America as represented by the National Aeronautics and Space Administration, Washington, D.C.

[22] Filed: Nov. 29, 1972

[21] Appl. No.: 310,616

[52] U.S. Cl. .......................................... 324/83 Q
[51] Int. Cl. ............................................ G01r 25/00
[58] Field of Search ...... 324/83 A, 83 Q, 8 B, 8 FE; 328/166; 307/232

[56] References Cited
UNITED STATES PATENTS
3,414,823   12/1968   Knox .............................. 328/166 X
2,914,684   11/1959   Essler ................................. 307/232

Primary Examiner—Alfred E. Smith
Attorney, Agent, or Firm—L. D. Wofford, Jr.; G. J. Porter; J. R. Manning

[57] ABSTRACT

A quadrature component cancellation and measuring system comprising a detection system for detecting the quadrature component from a primary signal, including reference circuitry to define the phase of the quadrature component for detection. A Raysistor optical coupling control device connects an output from the detection system to a circuit driven by a signal based upon the primary signal. Combining circuitry connects the primary signal and the circuit controlled by the Raysistor device to subtract quadrature components. A known current through the optically sensitive element produces a signal defining the magnitude of the quadrature component.

2 Claims, 3 Drawing Figures

AUTOMATIC QUADRATURE CONTROL AND MEASURING SYSTEM

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to phase elimination and measurement circuits and, more specifically, to circuits for cancelling and measuring quadrature components, notably useful in electrical measuring systems and servo control systems.

Quadrature components of signals are those components 90° out of phase with the component of interest. They arise from imperfections or less-than-ideal characteristics of a system. Often a system is designed to utilize or respond to a reactive component. Since virtually all actual reactive components have some resistance, a quadrature component referable to the effects of the resistance is created. This is a common factor in instrumentation systems, where reactance transducers are used for measuring such parameters as pressure, displacement, liquid level, and fluid density. Undesired quadrature signals are also a known problem in servo control systems.

Quadrature signals load the elements of instrumentation systems and thereby introduce errors into such systems. In servo systems, heat is generated in the servo motors by the quadrature components, causing loss of resolution, high power drain, and poor reliability.

In previous instrumentation systems and control systems quadrature signals have been approached in the design in various ways, including simply accepting the errors caused by quadrature, compromising other parameters to achieve a system insensitive to quadrature, hermetically sealing sensitive parts, and gating out quadrature signals by use of phase detectors and switching networks. Switching networks virtually inherently introduce new distortion, are relatively inaccurate for read-out, and do not provide for quadrature rejection at an early stage in the system so that subsequent stages need not carry the load of the quadrature signals.

An underlying design approach of this invention, the sensing of the quadrature component and the return of a signal based upon the sensed signal in subtractive relationship, is a known alternative taking various forms in the prior art. No similar prior system is known to employ optical coupling.

SUMMARY OF THE INVENTION

It is a primary object of this invention to provide a practical and accurate system to minimize quadrature effects.

It is, similarly, an object of this invention to provide a practical and accurate system to measure quadrature components in a system in which quadrature effects are minimized.

It is a major object of this invention to provide a system which reduces quadrature components at an early stage, so that subsequent stages in the system are not affected by the component.

It is an object of this invention to provide a system to reduce the effects of quadrature and, alternatively, to measure the quadrature, composed of electronic components without switching networks or moving parts.

With quadrature eliminated in the initial stages of a system, transducer selection and the like in the overall design may be made without restraints caused by quadrature effects.

In accordance with this invention quadrature components of a signal produced are detected. A signal based upon the quadrature component is returned in subtractive relationship to the signal produced, controlled in magnitude by an optical coupling between the detection system and the return system. Measurement of the value of the optically responsive element is used to define the value of the component detected.

BRIEF DESCRIPTION OF THE DRAWINGS

These and other objects, features, characteristics, and advantages of the invention will be apparent by consideration of the following description of preferred embodiments, as illustrated by the accompanying drawings.

DESCRIPTION OF THE PREFERRED EMBODIMENTS

Figure 1:
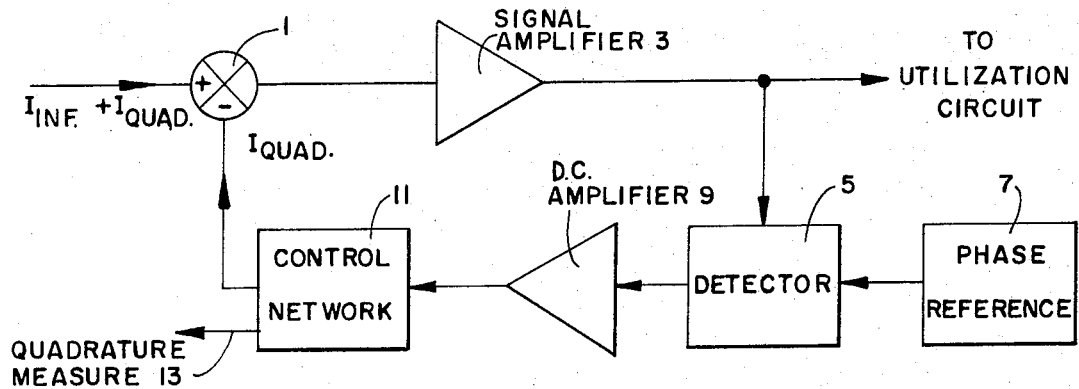
FIG. 1 is a block diagram of a system in which the stage of amplification in the return loop is also a part of the utilization system.

Major elements of the system are shown in FIG. 1. An input signaling device, which may be a capacitive or inductive transducer, creates a signal $I_S$ with components $I_{Inf}$ (Information) and $I_{Quad}$ (Quadrature). The signal is fed to a combining network 1. The output of the network 1 is connected to an amplifier 3, which in the system of FIG. 1 is linked to and is therefore a part of the utilization circuit. In various applications the utilization circuit may be measuring system or servo motor.

A detector 5 is in a return loop from the output of amplifier 3. Phase reference circuit 7 limits detector 5 to response to only quadrature signals.

The output of detector 5 is amplified by DC amplifier 9. The output of amplifier 9 is the input to a control network 11, which determines the amplitude of a signal returned to network 1 in a subtractive relationship to the initial $I_{Quad}$. The magnitude of the quadrature signal can be measured from the output of the control network 11 on output line 13.

Accordingly, the quadrature component at the output of network 1 is cancelled electronically. The cancellation will typically be virtually absolute and complete, and the component will therefore not appear in the other parts of the utilization circuit to saturate stages or otherwise influence the output.

Figure 2:
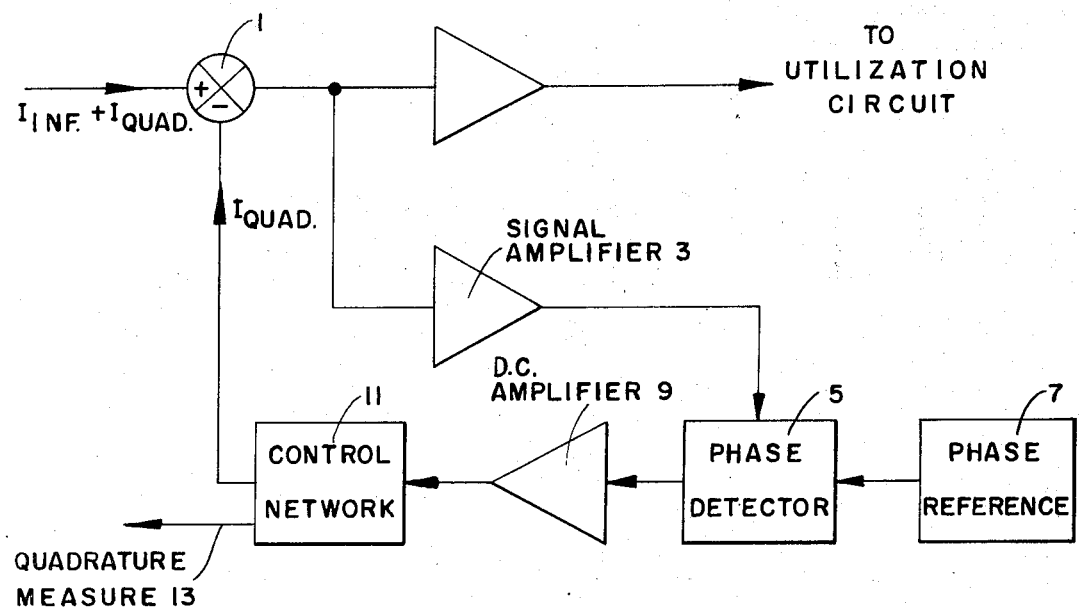
FIG. 2 is a block diagram of a system identical to that of FIG. 1 except that the stage of amplification in the return loop is not part of the utilization system.

If no early stage of amplification appears in the utilization circuit or if the existence of the quadrature component in the early stage is not desired, an arrangement as illustrated in FIG. 2 is employed. In that system the amplifier stage 3 at the output of network 1 is in the loop circuit and the utilization circuit is connected separately to the output of network 1.

Figure 3:
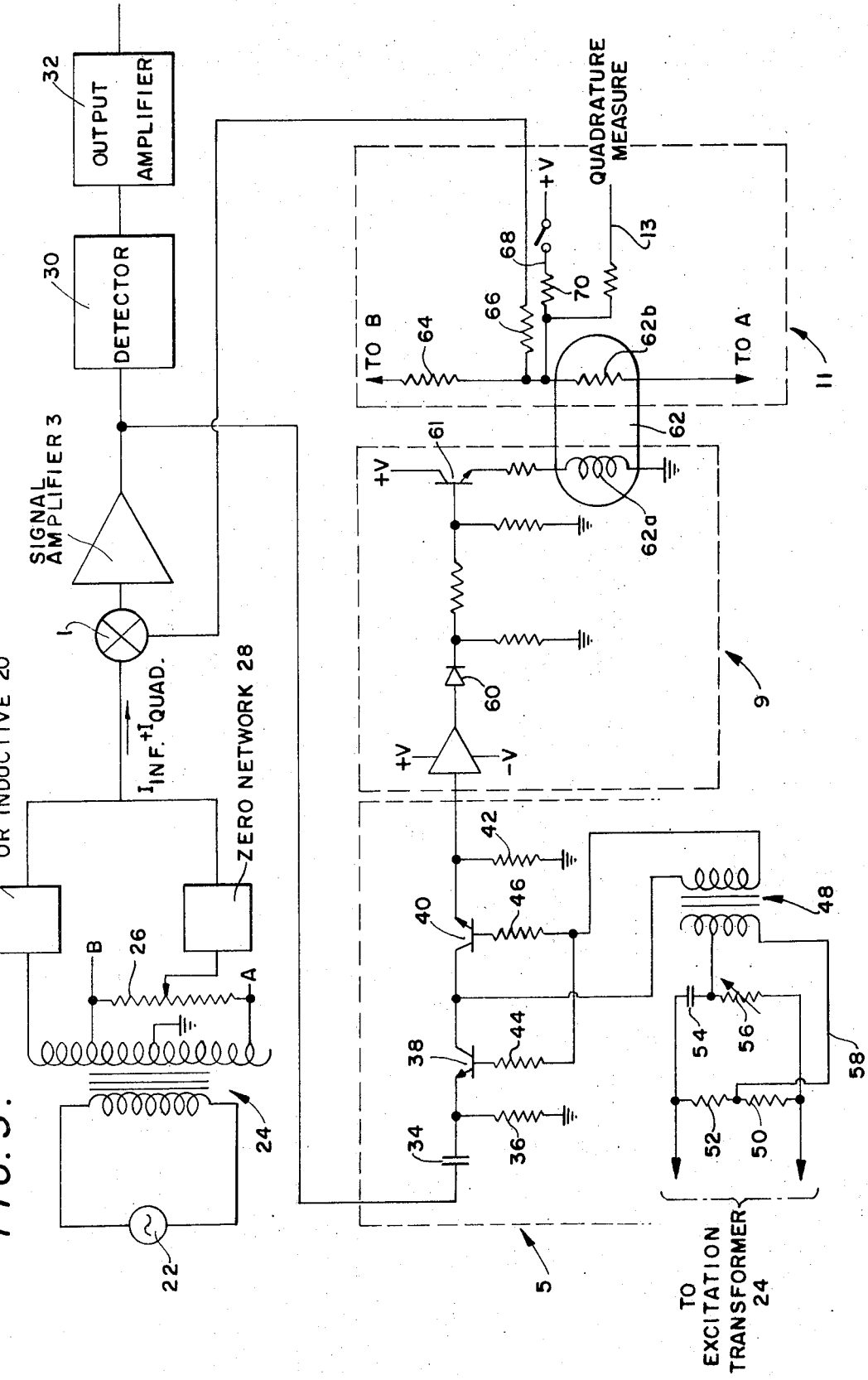
FIG. 3 is a detailed illustration of a measuring system employing the arrangement of FIG. 1 and showing the circuit diagram of the primary new features.

Reference is made to FIG. 3 for a more specific illustration of the elements and major components of a typical preferred system in accordance with this invention, specifically that of FIG. 1.

The overall device is a measuring system, for example a liquid level gauge, employing a capacitive or inductive device 20 as an observation transducer.

An excitation supply 22 drives the primary of an excitation transformer 24. The secondary of the transformer 24 is grounded at the center, with one end connected to transducer 20 and the other end connected to one end A of resistor 26. The other end B of resistor 26 is connected to the secondary of transformer 24 between the ground and transducer 20.

A sliding contact connects resistor 26 to zero network 28. Zero network 28 and the side of transducer 20 away from transformer 24 are connected together and to combining network 1. The system shown, which provides signals to network 1, is essentially conventional, with zero network 28 being adjustable so that a zero signal is presented when transducer 20 senses a reference status, such as an empty condition of a liquid level gauge chamber.

The output of network 1 is the input of amplifier 3. The output of amplifier 3 connects to the detector 5 of the loop circuit. It connects also to a detector 30 and output amplifier 32 in a typical utilization circuit.

Detector 5 comprises a capacitor 34 connected to a resistor 36, which is connected to ground. The junction of capacitor 34 and resistor 36 is connected to the emitter of transistor 38. The collector of transistor 38 is connected to the collector of transistor 40. The emitter of transistor 40 is connected to the input of DC amplifier 9 and also to ground through a relatively large resistor 42.

Each base of transistor 38 and 40 is connected to a resistor 44 and 46 respectively, of the same resistance, which is of relatively moderate magnitude. The other ends of resistors 44 and 46 are connected together and to one side of the secondary of transformer 48. The other side of the secondary of transformer 48 is connected to the junction of the collectors of transistors 38 and 40.

The primary of transformer 48 is driven from the excitation transformer 24 through a network comprising 1K resistors 50 and 52 connected across the terminals to the excitation transformer 24; capacitor 54 connected from the driven end of resistor 52 to one end of the effective primary of transformer 48; and an adjustable, 10K resistor 56 connected from that end of the primary to the driven end of resistor 50. Also, a lead 58 connects the junction of resistors 50 and 52 to the other terminal of the primary of transformer 48.

DC amplifier 9 is essentially conventional, containing a diode 60 leading to an output stage with a transistor 61 having a collector connected to a source of potential, the base driven from the preceding elements, and load elements connected from its emitter to ground.

One of the load elements is the light generating element 62a of a Raysistor control device 62. The light-responsive resistance element 62b of the device 62 is in the resistance network of the control network 11.

Raysistor is a trade name for a four-terminal control device employing a light source and a photoresistive element in a light-isolation case.

Control network 11 comprises a resistor 64 with one end connected to one terminal of photoresistor 62b and with the other end connected to point B at the end of resistor 26 at excitation transformer 24. The other end of photoresistor 62b is connected to point A at the transformer 24. A resistor 66 is connected to the junction of resistors 62b and 64 and is connected as the return input to combining network 1.

A lead 68 containing resistor 70 is connected to the junction of resistors 64 and 62b. Resistor 70 is very large in magnitude relative to any value of resistor 62b. A positive voltage may be applied to lead 68, which thereby provides a substantially predetermined current across resistor 62b, and the potential drop on parallel lead 13 is observed to measure the magnitude of the quadrature component.

In Operation

Transducer 20, driven by excitation transformer 24, along with the other associated elements, function conventionally to produce a signal having a reactive component desired to indicate the status sensed by transducer 20 and having a quadrature component which is not desired.

That signal passes through network 1 and is amplified by amplifier 3. The amplified signal is presented through capacitor 34 to the emitter of transistor 38.

At the same time, a signal taken from the drive signal to transformer 24 is applied to transformer 48 through the essentially resistive network of resistors 50, 52, and 56. The signal at the secondary of transformer 48 is in phase with the quadrature component $I_{Quad}$ of the signal passing through network 1 and amplifier 3. That signal is connected across the base and collector of both transistors 38 and 40 and serves as a phase reference.

Components of signals 90° out of phase with those from transformer 48 do not overcome the potential from transformer 48 and therefore are not conducted through transistors 38 and 40. Quadrature signals, $I_{Quad}$, being in phase with those from transformer 48, appear during intervals when they are not opposed effectively by those signals and thereby are conducted through transistors 38 and 40. The degree of conduction increases as the magnitude of the quadrature component increases and vice versa.

The signal generated is amplified in DC amplifier 9, where the signal is applied at the base of transistor 61 and light generating element 62a of device 62 is driven in direct proportion to the signal produced by detector 5. The output sense is inverted in that an increase in signal from detector 5 produces a decrease in light produced from element 62a and vice versa.

The magnitude of this signal is communicated directly by the optical coupling, instantly and accurately, and without transients or moving parts, to the photoresponsive resistor 62b of device 62. The effect is inverse in that an increase of light, representing a smaller signal from detector 5, produces a reduction in the magnitude of resistor 62b.

The signal across resistors 64 and 62b is tapped directly from the excitation transformer 24 and presents the quadrature component through resistor 66 to network 1 in subtractive (phase inverted) relationship.

Accordingly, detection of a quadrature signal at detector 5 results in an increase in magnitude of resistor 62b, thereby applying an increased portion of the signal across resistors 64 and 62*b* to network 1. That reduces the quadrature signal, and the signal detected at 5 is reduced accordingly.

The amount of quadrature signal detected at 5 is directly proportional to the present value of 62*b*. That value is measured by applying a known DC potential +V across 62*b* through resistor 70, which is relatively great in value, and observing the resulting potential drop on parallel line 13.

Performance of the above system established that it is capable of automatically neutralizing quadrature signals in excess of 10 times the full-scale, in-phase signal to a level of greater than 45 db below the full-scale, in-phase signal. Tests include operation at temperatures of $-20°$ C and $-70°$ C.

Adaptations

It will be clear that the control system described may be employed as an element of systems for different applications and that the quadrature measurement feature can be utilized as a primary or separate system. For example, the addition of a second, slightly modified circuit to the instrumentation system described in detail above converts the system to an automatic, solid-state, null-balance system. The second system would be identical to the return system for quadrature in FIG. 3 except the resistor 66 would be replaced by a capacitor and the phase reference elements would be adjusted to an additional 90° phase shift. Read-out of the in-phase signal would be by applying a reference current across the variable resistance of the second system, and that would eliminate the need for the utilization circuits shown in the drawings.

Other modifications and adaptations will be apparent, and variations may well be developed which employ more than ordinary skill in this art, but nevertheless employ the basic contribution and elements of this invention. Accordingly, patent protection should not be essentially limited by the preferred embodiments disclosed, but should be as provided by law, with particular reference to the accompanying claims.

What is claimed is:

1. An electronic system comprising a reactive measurement transducer, means to detect quadrature signals produced by said transducer comprising two transistors connected collector-to-collector with a source of a signal approximately in phase with said quadrature signals connected in two circuits, each including the base and collector of one of said transistors, with output signals from said transducer connected to an emitter of one of said transistors, the emitter of the other of said transistors of said means to detect connected to a diode, the output of said diode being connected through a resistor to ground and the junction of said diode and said resistor being connected to the base of an amplifying transistor, the collector of said amplifying transistor being connected to a source of reference potential and the base of said amplifying transistor being connected to ground through an optical radiation generator which responds directly to electrical current, signals from said means to detect producing a decrease in output current of said amplifying transistor, thereby producing a decrease in light from said optical generator, a photoresponsive element adapted to respond to the radiation of said optical generator by reduction in electrical resistance with increase in said radiation, said optical generator and said photoresponsive element being in a light-isolation case, a resistor connected in series with said photoresponsive element and a source of said quadrature signals connected across said series connection of said photoresponsive element and said resistor, and a return resistor connected to the junction of said photoresponsive element and said resistor and connected to conduct said quadrature signals connected across said series connection through said return resistor in subtractive relationship to a location presenting signals produced by said transducer so that quadrature signals from said transducer are cancelled.

2. The system as in claim 1 also comprising means to apply a predetermined current across said photoresistive element and to observe the magnitude of the potential drop across said photoresistive element.

* * * * *